United States Patent Office 3,695,856
Patented Oct. 3, 1972

3,695,856
MAGNESIA SUPPORTS FOR CATALYSTS IN HYDROCARBON REFORMING
Claude Paul and Henri Cheron, Toulouse, France, assignors to Azote et Produits Chimiques, Toulouse, France
No Drawing. Filed Mar. 19, 1970, Ser. No. 21,213
Claims priority, application France, Mar. 20, 1969, 6907428
Int. Cl. B01j 11/06, 11/22; C01b 2/14
U.S. Cl. 48—214
8 Claims

ABSTRACT OF THE DISCLOSURE

For the catalytic steam reforming of hydrocarbons, a novel catalyst composition substantially free of alkali metal oxide and
(a) a carrier comprising 70–100% uncombined magnesia, 0.30% of a spinelle, the latter being a product of magnesia combined with an oxide of trivalent metal, and 0–15% of $SiO_2$ in the form of an aluminum silicate, and
(b) a catalytically active metal selected from the group consisting of cobalt, nickel and mixtures thereof.
At least a portion of the active metal is in the form of a coating on the internal porous surfaces of the carrier. This catalyst has a long life and in particular does not lead to carbon black formation.

BACKGROUND OF THE INVENTION

This invention relates to catalyst compositions, especially useful for the steam reforming of hydrocarbons, particularly gaseous or liquid hydrocarbons having a boiling point lower than 350° C. It is more specifically directed to catalysts for the continuous reforming of natural gas, refinery gases, liquefied petroleum gases such as propane and butane, as well as light boiling fuels having a final boiling point comprised between 100 and 200° C. The composition of the resultant gas can be varied considerably. For instance, catalyst compositions of the invention can be used for preparing an hydrogen-rich gas such as synthesis gas for amomnia or alcohols, as well as a gas having a high calorific power such as city gas.

It is known that catalysts used in steam reforming comprise a catalytically active metal present either in the metallic form. or as a reducible precursor thereof, the active metal being incorporated on refractory supports. As the active metal, nickel is more generally used. Cobalt has also been proposed, but such catalysts have such a substantially lower activity, it is necessary to employ a severe activating thermal treatment over and above the thermal treatments usual for nickel catalyst compositions. The refractory support can be aluminum silicate, such as, for example kaolin; magnesium silicate; oxides such as magnesia, alumina, silica, chromium oxide; and more often, a mixture of these different compounds with optionally intermixed with oxides of zirconium, titanium, manganese and the like.

The usual catalyst compositions are prepared according to one of several methods. A most often used method comprises adding to the oxides of the composition a hydraulic binder, generally an aluminous cement. Despite the addition of relatively large quantitites of binder, the resultant catalysts have insufficient mechanical strength for being suitably regenerated if they are accidentally poisoned by carbon black or sulphur compounds (such poisons being formed as a result of the plant being out of order or of a failure of the system for desulphurizing the treated hydrocarbons). The catalyst compositions can also be prepared by impregnating a previously shaped carrier with the catalytically active element, or by shaping and calcining at high temperature a pulverulent mixture containing the oxide(s) of the refractory carrier and a reducible metal precursor. Such calcined catalysts have a much higher mechanical strength than the compositions containing a hydraulic binder. However, the catalysts obtained by high temperature calcination are disadvantageous because of the extra step required for reducing the metal precursor compound.

Whatever the method of preparation of the various catalyst compositions heretofore proposed, an alkali metal oxide must generally be added to these compositions in order to decrease the catalytic activity of the active metal, to favor the hydrogenation reaction and to avoid the deposit of carbon black. The latter is very harmful because it reduces both catalyst activity and mechanical strength up to the point of total catalyst destruction. However, the presence of alkali metal oxide in the catalysts presents additional serious problems. These oxides always tend to migrate during the operation of the plant whereby on one hand the catalyst content in alkali metal oxides decreases progressively and the tendency to carbon formation reappears and gradually increases, and on the other hand these oxides are entrained and deposited along the gas flowpath thereby causing degradation to the equipment.

SUMMARY OF THE INVENTION

With reference to the aforesaid problems of the prior art, an object of this invention is to provide catalyst compositions having excellent mechanical strengths which are less likely to be poisoned by carbon black formation without attendant disadvantages of the catalysts containing alkali metal oxides.

Upon further study of the specification and appended claims, other objects and advantages of the present invention will become apparent.

To attain these objects, the catalyst compositions of this invention comprise:

a shaped carrier substantially free of alkali metal oxide containing 70 to 100% by weight of non-combined magnesia, 30 to 0% of a spinelle obtained by combination of magnesia with at least one oxide of a trivalent metal, and optionally an aluminum silicate in a proportion such that the quantity of silica (calculated as $SiO_2$) does not exceed 15% by weight of the carrier; and a catalytically active metal, cobalt and/or nickel, at least a fraction of which is deposited on the carrier by impregnation in a quantity (calculated as CoO or NiO) not exceeding 12% by weight of the composition.

The shaped carrier is preferably prepared by mixing the oxide(s) (magnesia and oxide(s) of a trivalent metal) with a small quantity of water and mixing the resultant mass to obtain a paste which can then be extruded and cut according to the desired shape: rings, solid or hollow cylinders, grooved cylinders and the like. After shaping, the carrier is dried and then calcined for several hours at a temperature of 1200–1500° C., preferably in the vicinity of 1400° C., i.e., about 1375–1425° C.

DETAILED DISCUSSION OF THE INVENTION

As the raw material for preparing the carrier, it is preferred to employ commercial products having an alkali metal oxide content which is as low as possible. As a general rule, since magnesia is the sole or the essential constituent of the carrier, it is sufficient to use magnesia having a content in non-combined alkal metal oxides, calculated as $Na_2O$, of not higher than about 0.5% and preferably lower than 0.3%. It has been observed that under these conditions and contrary to the opinion generally accepted heretofore, no carbon black is formed during the continuous reforming of hydrocarbons in the presence of steam.

The oxide(s) of trivalent metal forming a spinelle with magnesia are preferably oxides of aluminum, chromium or titanium; however, other trivalent metals can be used such as nickel, cobalt or iron. The addition of an oxide which combines with magnesia in hereabove specified proportions increases the mechanical strength of the carrier while its porosity remains sufficient to allow a good impregnation by the catalytically active metal.

If desired, an aluminum silicate such as, for example, kaolin, sillimanite and the like can be added to magnesia or to the whole magnesia-spinelle. It has been found that the presence of such a silicate is not troublesome and does not substantially decrease the catalytic activity provided that the quantity of $SiO_2$ in the carrier is maintained at a value lower than 15%. As a general rule, when using an aluminum silicate, the proportion of $SiO_2$ is preferably 5–10% by weight. The addition of aluminum silicate which is a binding agent facilitates the preparation of the carrier and increase its mechanical strength.

As the catalytically active metal, cobalt is used in a usual quantity of 2.5–10% (calculated as CoO), preferably 5.5–8% by weight of the catalyst composition. Nickel can also be used in the same proportions but it is most often more preferable to use a slightly higher quantity of nickel, for example 4–12% by weight of NiO. The active element is deposited on the carrier (support), by soaking the latter in an aqueous solution of a nickel and/or cobalt salt or a compound able to yield an oxide by calcination. An excellent impregnation by the metallic solutions is obtained due to the high porosity of the magnesia-rich carrier of the invention. Indeed the volumetric porosity of the carrier is comprised between 27 and 41%, preferably from 35 to 41% and more advantageously from 36 to 39%.

The carrier impregnated with the solution is then calcined at a temperature of about 400–500° C. to yield the oxide(s) which settle into the pores of the refractory material. The oxides so-deposited into the carrier are reduced substantially totally and immediately as soon as the catalyst is put into operation. Therefore, it is not necessary to start the operation of the catalyst under hydrogen atmosphere.

For some uses, as for example, the manufacture of a methane-rich gas which requires that reforming be performed at temperatures lower than 600° C., the quantity of active metal capable of being fixed on the support by impregnation is not sufficient. It is then necessary to introduce into the paste before shaping and calcining the carrier, a certain quantity of cobalt or nickel oxide, preferably 10–15% by weight. As indicated above, such a method of preparation yields catalysts requiring a reduction before being put into operation. To avoid this drawback, the resulting calcined catalyst is impregnated with a dilute solution of the salt of the active metal, in order to fix an additional quantity of the active metal, preferably 2–5% by weight, or more. These impregnated oxides are then sufficient to initiate the reforming reaction and produce the hydrogen necessary for the reduction of the remaining oxides incorporated in the paste before shaping.

The catalyst compositions of the invention have an excellent specific surface and their activity is totally satisfactory in spite of the relatively low quantities of active element used, which in turn decreases the operating expenses of steam reforming units. Due to the great mechanical strength of these catalysts, reforming can be carried out under high pressure, generally from 20 to 40 bar, but if desired, up to 100 bar. Moreover, catalysts of the invention can withstand without any damage the mishaps of operation which causes carbon deposition on and in the catalyst. Indeed, it has been observed that they support carbon removal without physical degradation or permanent loss of activity. In addition, filling of the catalyst-holding tubes can be simplified: it is performed more rapidly and without the usual precautionary measures which must be taken when using more brittle masses.

The catalyst compositions as described are also advantageous because they can be used for obtaining gases having variable methane contents whereby the production of very different gases is possible in the same type of plant, from a hydrogen-rich gas having a low methane content to a methane-rich gas having high thermal values. Whatever the gas prepared, the operation can be conducted under optimum conditions, particularly with ratios of steam/carbon of the treated hydrocarbons as low as possible according to the result desired.

The impregnated NiO and/or CoO is present in the catalyst as more exposed and active than the corresponding oxides present in the calcined support. Whereas the active metal oxides are in the form of an intimate, substantially homogeneous mixture with the magnesia, the impregnated metal oxides are present in the form of coatings in the internal surfaces of the support.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A catalyst carrier was prepared from magnesium and aluminum silicate and shaped into little hollow cylinders 15 mm. in length and having a diameter of 15 mm. Its composition by weight is as follows:

| | Percent |
|---|---|
| MgO | 76.8 |
| $Al_2O_3$ | 8 |
| $SiO_2$ | 15 |
| Alkali metal oxides (calculated as $Na_2O$) | 0.2 |

This carrier was soaked in a cobalt nitrate solution containing 200 g. of Co per liter and then calcined at 450° C. A catalyst composition was obtained containing 6% by weight of CoO. This catalyst was used for continuous steam reforming of a light boiling fuel having an initial boiling point of 45° C. and a final boiling point of 120° C., previously desulphurized to 0.2 p.p.m. of sulphur. Reforming was conducted in a catalyst-holding tube 10 m. in length and having a diameter of 92 mm. under the following conditions:

| | |
|---|---|
| Ratio steam/carbon of the treated hydrocarbons | 3. |
| Pressure | 25 bar. |
| Inlet temperature | 575° C. |
| Outlet temperature | 775° C. |
| Spatial velocity | 1 l./1 l./1 h. (liter of gas per liter of catalyst per hour.) |

A gas was obtained having the following composition in volume percent of dry gas:

| | |
|---|---|
| $CO_2$ | 15 |
| $H_2$ | 62.5 |
| $N_2$ | 0.3 |
| CO | 11.5 |
| $CH_4$ | 10.7 |
| $C_2H_6$ and higher | 0 |

EXAMPLE 2

The catalyst was prepared as follows: magnesia, chromium oxide and nickel oxide were mixed with water to form a paste. By extruding this paste, hollow cylinders 15 mm. high and 15 mm. diameter were obtained and then calcined at 1400° C. This catalyst having the composition:

|     | Percent |
| --- | --- |
| MgO | 72 |
| $Cr_2O_3$ | 12.8 |
| $Na_2O$ | 0.2 |
| NiO | 15 | was soaked in a nickel nitrate solution and then calcined at 450–500° C. After calcination its composition was:

|     | Percent |
| --- | --- |
| MgO | 70.2 |
| $Cr_2O_3$ | 12.4 |
| $Na_2O$ | 0.2 |
| NiO | 17.2 |

This catalyst was used in a continuous steam reforming plant for treating a light boiling fuel having an initial boiling point of 45° C. and a final boiling point of 120° C., and containing 0.2 p.p.m. of sulphur.

The operation was performed under the following conditions:

(a)

Ratio steam/carbon of the
   treated hydrocarbons _____ 2.5.
Pressure _____ 18 bar.
Inlet temperature _____ 500° C.
Outlet temperature _____ 660° C.
Spatial velocity _____ 1 l./1 l./1 h.

A gas was obtained having the following composition in percent of dry gas:

| $CO_2$ | 19 |
| --- | --- |
| $H_2$ | 48 |
| $N_2$ | 0.5 |
| CO | 5.5 |
| $CH_4$ | 27 |
| $C_2H_6$ and higher | 0 |

This gas has a calorific power of 4235 mth.

(b)

Ratio steam/carbon of the
   treated hydrocarbons _____ 4.
Pressure _____ 18 bar.
Inlet temperature _____ 500° C.
Outlet temperature _____ 750° C.
Spatial velocity _____ 1 l./1 l./1 h.

A gas was obtained having the following composition in percent of dry gas:

| $CO_2$ | 16.3 |
| --- | --- |
| $H_2$ | 67.2 |
| $N_2$ | 0.3 |
| CO | 9.9 |
| $CH_4$ | 6.3 |
| $C_2H_6$ and higher | 0 |

EXAMPLE 3

A catalyst carrier was prepared as in the preceding example but from magnesia only. It was soaked in a cobalt nitrate solution and calcined at 500° C. The resultant catalyst contained 5% by weight of CoO. This catalyst was used for continuous steam reforming of a petroleum fraction having an initial boiling point of 25° C. and a final boiling point of 290° C. The operation was carried out in a catalyst-holding tube as described in Example 1 but under the following conditions:

Pressure _____ 30 bar.
Inlet temperature _____ 560° C.
Outlet temperature _____ 780° C.
Spatial velocity _____ 1 l./1 l./1 h.

According to the ratio R (steam/carbon of the treated hydrocarbons) gases were obtained having the following compositions (percent of dry gas):

| R | $CO_2$ | $H_2$ | $N_2$ | CO | $CH_4$ | $C_2H_6$ and higher |
| --- | --- | --- | --- | --- | --- | --- |
| 3.5 | 17 | 62.5 | 0.5 | 10.5 | 9.5 | 0 |
| 4 | 16.2 | 65.9 | 0.4 | 10 | 7.8 | 0 |
| 5 | 17.1 | 68.5 | 0.4 | 9 | 5.4 | 0 |

After a two-month operation in a pilot plant, no carbon black formation was observed.

EXAMPLE 4

A catalyst carrier prepared as in Example 1 was used. This carrier was soaked in a nickel nitrate solution containing 200 g. per liter of Ni and then calcined at 450° C. This soaking operation was effected twice in order to obtain a catalyst composition containing 8.25% of NiO.

This catalyst was used for steam reforming of a previously desulfanized natural gas containing only 0.02 mg. of sulfur per m.³. Reforming was conducted in a catalyst-holding tube 10 m. high and 92 mm. diameter under the following conditions:

Ratio steam/carbon of the
   treated hydrocarbons _____ 4.5
Pressure _____ 30 bar
Inlet temperature _____ 500° C.
Outlet temperature _____ 775° C.
Spatial velocity _____ 1.4 l./1 l./1 h.

A gas was obtained having the following composition in percent of dry gas:

| $CO_2$ | 11.95 |
| --- | --- |
| $H_2$ | 71.85 |
| CO | 8.0 |
| $CH_4$ | 8.2 |
| $C_2H_6$ and higher | 0 |

EXAMPLE 5

The catalyst of Example 4 was used without any alteration for reforming of a light boiling fuel having the same characteristics as the fuel treated in Example 1. The operation was conducted under the following conditions:

Ratio steam/carbon of
   treated hydrocarbons _____ 4.5.
Pressure _____ 30 bars.
Inlet temperature _____ 500° C.
Outlet temperature _____ 770° C.
Spatial velocity _____ 1.25 l./1 l./1 h.

A gas was obtained having the following composition in percent of dry gas:

| $CO_2$ | 16.90 |
| --- | --- |
| $H_2$ | 67.0 |
| CO | 9.2 |
| $CH_4$ | 6.9 |
| $C_2H_6$ and higher | 0 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising the continuous vapor phase, catalytic steam reforming of hydrocarbons having a boiling point from 45° C. up to 350° C., wherein a mixture of steam and said hydrocarbons are passed through a tube containing particulate catalyst under a pressure of about 20–100 bar at a high temperature, the improvement comprising employing as said particulate catalyst a catalyst composition consisting essentially of, on a weight basis:
(a) a carrier having a volumetric porosity between 27 and 41% and comprising 70–100% uncombined magnesia, 0–30% of a spinelle, the latter being a product of magnesia combined with an oxide of trivalent metal, and 0–15% of $SiO_2$ in the form of an aluminum silicate, said carrier being substantially free of alkali metal oxide, and
(b) a catalytically active metal selected from the group consisting of cobalt, nickel and mixtures thereof, at least a portion of which is deposited on the carrier by impregnation in the form of a coating on the surfaces of said carrier, whereby the use of said catalyst composition results in a process wherein carbon black formation is avoided over extended periods of time.

2. A process as defined in claim 1 wherein said hydrocarbons have a final boiling point between 100 and 200° C.

3. A process as defined by claim 1 wherein the active metal does not exceed 20% by weight.

4. A process as defined by claim 1 wherein the active metal is present in a concentration of 15–20% by weight.

5. A process as defined by claim 1, said carrier containing less than 0.5% of alkali metal oxide calculated as $Na_2O$.

6. A process as defined by claim 1 wherein the catalytically active metal is totally in the form of a coating on the surfaces of the carrier and does not exceed 12% by weight.

7. A process as defined by claim 1 wherein the catalytically active metal is deposited in the form of a coating on the surfaces of the carrier in a concentration of 2.5–12% by weight.

8. A process as defined by claim 7 wherein said carrier further comprises said catalytically active metal intimately and uniformly admixed therewith.

References Cited

UNITED STATES PATENTS

| | | | |
|---|---|---|---|
| 2,229,199 | 1/1941 | Voorhies | 23—212 RX |
| 3,436,358 | 4/1969 | Thygesen | 23—212 RX |
| 3,467,506 | 9/1969 | Roche | 48—214 |
| 3,345,307 | 10/1967 | Paul et al. | 252—457 X |
| 2,445,345 | 7/1948 | Byrns | 252—457 X |
| 2,639,223 | 5/1953 | Shapleigh | 252—457 X |
| 2,973,327 | 2/1961 | Mitchell et al. | 252—449 |
| 3,278,268 | 10/1966 | Pfefferle | 23—212 R |

MORRIS O. WOLK, Primary Examiner

R. E. SERWIN, Assistant Examiner

U.S. Cl. X.R.

252—455 R, 457